United States Patent Office 2,783,271
Patented Feb. 26, 1957

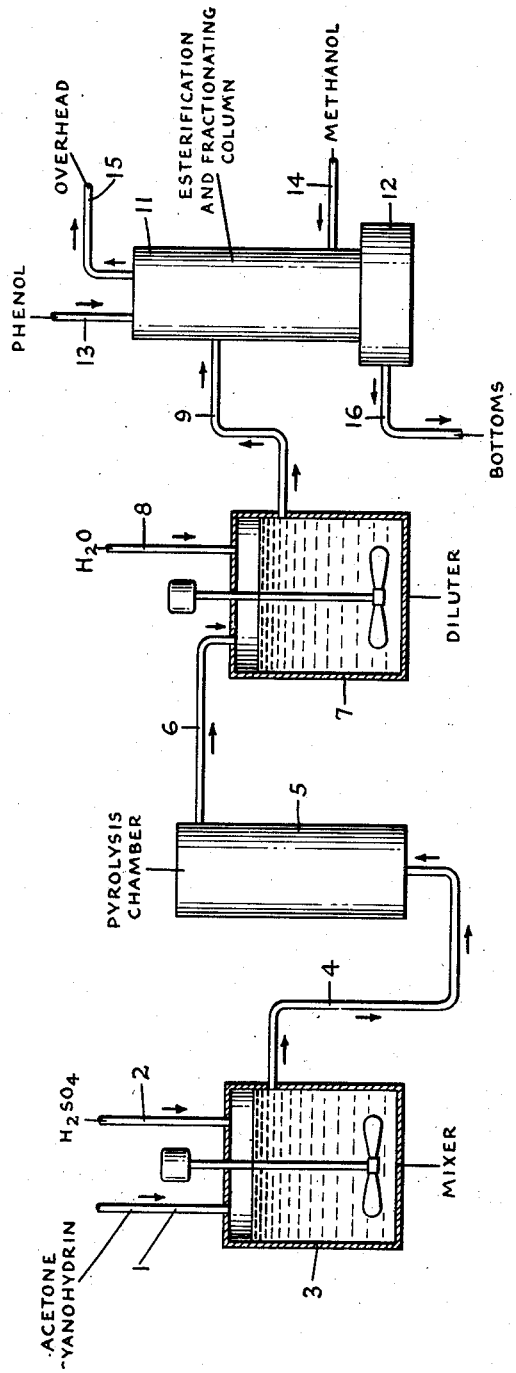

2,783,271

CONTINUOUS PRODUCTION OF METHACRYLIC ACID ESTERS

John C. Eck, Convent, and Steven J. Tunkel, Morristown, N. J., assignors to Allied Chemical & Dye Corporation, New York, N. Y., a corporation of New York Application June 29, 1954, Serial No. 440,054

7 Claims. (Cl. 260—486)

The present invention relates to continuous production of methacrylic acid esters, useful as raw materials for the manufacture of polymeric products, by reaction of acetone cyanohydrin, sulfuric acid and alcohols. More particularly, the present invention relates to the removal of semi-solid polymers formed during the esterification procedure.

A continuous process for the production of methacrylic acid esters from acetone cyanohydrin, sulfuric acid and alcohols may be carried out by reacting acetone cyanohydrin with concentrated or fuming sulfuric acid, subjecting the reaction mixture to pyrolysis, and then esterifying the pyrolyzed material with an alcohol and fractionating the reaction products in an esterification and fractionating column to produce methacrylic acid ester-containing distillate and ammonium acid sulfate-containing bottoms.

We have found that during operation of the esterification and fractionating column, despite the use of various polymerization inhibitors, certain semi-solid polymers form in the column. If these semi-solid polymers are allowed to accumulate, they eventually become hard solids which cause an increase in flow resistance through the column and finally result in plugging of the column. The common expedient in removing the semi-solid polymers has been to shut down the process and clean out the esterification and fractionating column. This procedure, of course, substantially reduces the efficiency of the process and adds considerably to its overall cost.

The object of the present invention is to provide a simple procedure for removing semi-solid polymers formed in the esterification and fractionating column during the production of methacrylic acid esters from acetone cyanohydrin, sulfuric acid and alcohols. Other objects and advantages of the invention will be apparent from the following description and appended claims.

According to the present invention, from time to time, as required to remove semi-solid polymers from the column, operation of the column is modified by cooling its upper portion sufficiently to establish substantial reflux of esterifying alcohol while feeding to the column pyrolyzed reaction mixture with esterifying alcohol in excess of that required for esterification. The cooled condition is maintained until reflux alcohol accumulating within the column flows into the bottoms section thereof. It has been discovered that when such flow is established, the polymer deposit within the column, which tends to concentrate at and somewhat above the inlet for the pyrolyzed reaction mixture, is removed from the column and transferred to the bottoms fraction with which it is withdrawn.

In continuous operation of esterification-fractionating columns for the purpose described, a quantity of esterifying alcohol in excess of that theoretically required to esterify the pyrolyzed reaction mixture may be, and preferably is, supplied as feed to the column. Unreacted alcohol and ester product leave the column as distillate, and ammonium acid sulfate by-product leaves in the residuum or bottoms fraction, which is preferably treated to recover ammonia values. When such procedure is followed, the polymer removal step of the invention may be effected simply by cooling the upper portion of the column, for example, by reducing temperature of any external reflux stream or of a trim coil, if present, until the desired flow of reflux alcohol into the bottoms is established. If during normal operation excess esterifying alcohol is not fed, it is necessary to increase the alcohol feed sufficiently to provide such excess.

According to a preferred aspect of the present invention, the removal of semi-solid polymers formed in the esterification and fractionating column may be realized without modification of column operating controls simply by increasing the esterifying alcohol feed into the column to a rate sufficient to effect the desired cooling of the column and establish the flow of reflux alcohol into the column bottoms.

Whatever column cooling method is employed, this flow of reflux alcohol is maintained until the desired polymer removal is effected. During this period the polymer is dissolved in the reflux alcohol and carried in solution by it to the column bottoms. There the bottoms are maintained by application of heat at temperature suitable for vaporization of the reflux alcohol and its return to the column proper for recondensation therein to form reflux solvent for any remaining polymer deposit. Polymer deposit thus transferred to the bottoms fraction is discharged from the column in that fraction and is eliminated from the system during further treatment of the bottoms to recover by-product ammonium acid sulfate.

In practice of all aspects of the invention, undesirable semi-solid polymers may thus be removed from the esterification and fractionating column without interrupting continuous operation. Such removal is generally undertaken at intervals dictated by experience which are dependent on esterification and fractionating conditions and nature and effect of polymerization inhibitors introduced prior to and during the esterification and fractionating procedure. Ordinarily, such intervals may be in the order of 1 day to 1 week. It is preferable to have frequent polymer removal periods of short duration, rather than to let the polymer build up to a thick coating.

The feed rate of esterifying alcohol required to produce substantial alcohol reflux for any given esterification and fractionating column, with or without other column cooling means being used, may readily be determined by those skilled in the art. In an efficiently packed column substantial alcohol reflux is ordinarily realized without additional cooling by introducing the esterifying alcohol at about 1.8 to 2.4 times its normal feed rate, and preferably at about 2.0 times its normal feed rate. Generally speaking, by use of these alcohol feed rates, removal of semi-solid polymers to the bottoms of the esterification and fractionating column is accomplished in a reasonably short time, e. g. about 15 minutes to 1 hour.

After the semi-solid polymers have been removed to the bottoms of the esterification and fractionating column, normal esterifying alcohol feed rate, and accordingly, distillation temperatures within the column are resumed, and bottoms and distillate contents thereof again exit the column by their normal paths. After achieving normal column conditions, column bottoms containing the undesirable semi-solid polymers are then removed.

If it is found that the volume of the column reboiler is too little to accommodate normal distillation column bottoms and reflux alcohol undergoing reboiling during the removal of semi-solid polymers, an appropriate portion of reboiler contents may be discharged prior to establishment of the alcohol reflux in the esterification and fractionating column.

The procedure of the present invention is not claimed to inhibit polymer formation in the esterification and fractionating column but replaces, at least in part, or supplements the use of polymer inhibitors. Although the use alone of alcohol reflux in the manner described above is effective to maintain the esterification and fractionating column sufficiently free of polymer deposit, use of inhibitors in the column extends the periods of operation between extractions by alcohol reflux.

The removal of semi-solid polymer materials from the esterification and fractionating column by the process of this invention possesses several advantages. First, we have found that it results in a purer ester product while not adversely affecting yields. Further, by means of the present procedure, no operational difficulties such as shutdown are experienced. Again, because of the absence of semi-solid polymer materials, the esterification and fractionating column has increased capacity. Another advantageous feature of the present process is that no puking of column contents occurs due to increased pressure drop throughout the column occasioned by presence of solid polymeric materials.

The procedure involved in a preferred modification of our process may be more clearly understood from the following example of continuous production of methyl methacrylate taken in connection with the accompanying flow diagram.

Acetone cyanohydrin and 100% sulfuric acid containing copper powder in an amount equivalent to 0.1% by weight of the acid as polymerization inhibitor, in mol ratio of one mol of acetone cyanohydrin to about 1.7 to 1.8 mols of sulfuric acid, are introduced through lines 1 and 2, respectively, into a mixer 3 provided with an agitator. In mixer 3 the cyanohydrin and sulfuric acid are reacted with stirring at a temperature of about 88° to 95° C. for about 1.1 to 1.9 hours. The reaction mixture overflows from mixer 3 through line 4 to the bottom of a pyrolysis chamber 5 where heating at about 138° to 140° C. for about 3.8 to 6.8 minutes takes place. The resultant mixture overflows chamber 5 through line 6 and passes to a diluter 7 provided with an agitator. Water is introduced through line 8 into diluter 7, in mol ratio of about 2.0 to 2.3 mols of water per mol of acetone cyanohydrin, and the diluted mixture is held with stirring at a temperature of about 80° to 95° C. for about 14 to 16 minutes. From diluter 7 the mixture flows via line 9 to an intermediate point of an esterification and fractionating column 11 provided with a reboiler 12 and which may be provided with filler bodies, bell plates, sieve plates or the like. A 20% by weight solution of phenol in methanol as polymerization inhibitor is introduced through line 13 at the top of column 11. Methanol, in mol ratio of about 2.8 to 3.0 mols of methanol per mol of cyanohydrin, is introduced through line 14 at the lower part, preferably near the bottom of column 11. The esterification reaction is carried out for about 30 seconds to 3 minutes using a reboiler temperature of about 135° C. and column temperatures ranging from about 120° C. at the bottom of the column to about 100° C. at the top of the column. During the esterification reaction a slow purge of air or oxygen is preferably introduced into reboiler 12 to aid in preventing polymerization and in elevating the vapors present. Vapors of methyl methacrylate, methanol and water evolve from the top of the esterification and fractionating column as overhead and pass via line 15 to a purification procedure for recovery of methyl methacrylate. By-product ammonium acid sulfate substantially free of methanol and methyl methacrylate is removed through line 16 as bottoms from the reboiler.

During the course of the esterification and fractionation procedure semi-solid polymers form in the esterification and fractionating column. Such polymers may be periodically removed from the column without interrupting continuous operation. In preferred procedure, this is done by discharging a portion of the contents of reboiler 12, usually about 1.6 to 2.75 gal. per cubic foot of total free space of the column, and continuously introducing methanol feed at rate sufficient to produce substantial methanol reflux while continuing normal feed rate of the pyrolzed reaction product of acetone cyanohydrin and sulfuric acid. Although it is preferred to introduce the excess methanol required by the present procedure through line 14 near the bottom of column 11, it will be obvious to those skilled in the art that the excess methanol can be introduced at any portion of the column. Refluxing of the methanol is continued to effect removal of the semi-solid polymers to the column bottoms. During the methanol refluxing operation the temperature at the top of column 11 is below about 65° C., and preferably about 55° to 70° C. After about ¼ to 1 hour, preferably about ¼ hour, normal methanol feed is resumed, and overhead and bottoms begin to form. After the reboiler becomes full, the semi-solid polymers are discharged together with by-product ammonium acid sulfate through line 16 as bottoms from the reboiler. In large scale installations it is usually found necessary following the procedure of the present invention temporarily to introduce additional heat to the column to bring the reboiler and upper portion temperatures back to normal.

The above-described technique for removing semi-solid polymers from the esterification and fractionating column is suitable for use during preparation of methacrylic acid esters, generally. It may also be used, for example, during the preparation of propyl, butyl, allyl and ethylene glycol methacrylic acid esters.

Although certain preferred embodiments of the invention have been described for purposes of illustration, it will be evident that various changes and modifications may be made therein without departing from the scope and spirit of the invention.

We claim:

1. In the process for the production of a methacrylic acid ester by reacting acetone cyanohydrin with sulfuric acid, pyrolyzing the resulting reaction product and continuously subjecting the pyrolyzed material to reaction with an alcohol in an esterification and fractionating column to produce methacrylic acid ester-containing distillate and ammonium acid sulfate-containing bottoms with concomitant formation of semi-solid polymers, the improvement which comprises establishing excess esterifying alcohol over that theoretically required to esterify the pyrolyzed material, periodically cooling the upper portion of the esterification and fractionating the column sufficiently to establish substantial alcohol reflux, maintaining such cooled condition until reflux alcohol containing the semi-solid polymers flows into the bottoms for vaporization therein to leave the semi-solid polymers in the bottoms, and discharging the semi-solid polymers with the bottoms.

2. In the process for the production of methyl methacrylate by reacting acetone cyanohydrin with sulfuric acid, pyrolyzing the resulting reaction product and continuously subjecting the pyrolyzed material to reaction with methanol in an esterification and fractionating column to produce methyl methacrylate-containing distillate and ammonium acid sulfate-containing bottoms with concomitant formation of semi-solid polymers, the improvement which comprises establishing excess methanol over that theoretically required to esterify the pyrolyzed material, periodically cooling the upper portion of the esterification and fractionating column sufficiently to establish substantial methanol reflux, maintaining such cooled condition until reflux methanol containing the semi-solid polymers flows into the bottoms for vaporization therein to leave the semi-solid polymers in the bottoms, and discharging the semi-solid polymers with the bottoms.

3. In the process for the production of methyl methacrylate by reacting acetone cyanohydrin with sulfuric acid, pyrolyzing the resulting reaction product and continuously subjecting the pyrolyzed material to reaction with methanol in an esterification and fractionating column to produce methyl methacrylate-containing distillate and ammonium acid sulfate-containing bottoms with concomitant formation of semi-solid polymers, the improvement which comprises establishing excess methanol over that theoretically required to esterify the pyrolyzed material, periodically cooling the upper portion of the esterification and fractionating column to establish substantial methanol reflux, maintaining such cooled condition until reflux methanol containing the semi-solid polymers flows into the bottoms for vaporization therein to leave the semi-solid polymers in the bottoms, reheating the upper portion of the column to normal fractionation temperatures, and discharging the semi-solid polymers with the bottoms.

4. In the process for the production of a methacrylic acid ester by reacting acetone cyanohydrin with sulfuric acid, pyrolyzing the resulting reaction product and continuously subjecting the pyrolyzed material to reaction with an alcohol in an esterification and fractionating column to produce methacrylic acid ester-containing distillate and ammonium acid sulfate-containing bottoms with concomitant formation of semi-solid polymers, the improvement which comprises periodically increasing the proportion of esterifying alcohol feed with respect to pyrolyzed material feed sufficiently to effect cooling of the upper portion of the esterification and fractionating column and to establish substantial alcohol reflux, maintaining such increased esterifying alcohol feed until reflux alcohol containing the semi-solid polymers flows into the bottoms for vaporization therein to leave the semi-solid polymers in the bottoms, and discharging the semi-solid polymers with the bottoms.

5. In the process for the production of methyl methacrylate by reacting acetone cyanohydrin with sulfuric acid, pyrolyzing the resulting reaction product and continuously subjecting the pyrolyzed material to reaction with methanol in an esterification and fractionating column to produce methyl methacrylate-containing distillate and ammonium acid sulfate-containing bottoms with concomitant formation of semi-solid polymers, the improvement which comprises periodically increasing the proportion of methanol feed with respect to pyrolyzed material feed sufficiently to effect cooling of the upper portion of the esterification and fractionating column and to establish substantial methanol reflux, maintaining such increased methanol feed until reflux methanol containing the semi-solid polymers flows into the bottoms for vaporization therein to leave the semi-solid polymers in the bottoms, and discharging the semi-solid polymers with the bottoms.

6. In the process for the production of a methacrylic acid ester by reacting acetone cyanohydrin with sulfuric acid, pyrolyzing the resulting reaction product and continuously subjecting the pyrolyzed material to reaction with an alcohol in an esterification and fractionating column to produce methacrylic acid ester-containing distillate and ammonium acid sulfate-containing bottoms with concomitant formation of semi-solid polymers, the improvement which comprises periodically introducing the esterifying alcohol at about 1.8 to 2.4 times its normal feed rate while continuing normal feed rate of the pyrolyzed material, thereby cooling the upper portion of the esterification and fractionating column and establishing substantial alcohol reflux, maintaining such increased alcohol feed until reflux alcohol containing the semi-solid polymers flows into the bottoms for vaporization therein to leave the semi-solid polymers in the bottoms, and discharging the semi-solid polymers with the bottoms.

7. In the process for the production of methyl methacrylate by reacting acetone cyanohydrin with sulfuric acid, pyrolyzing the resulting reaction product and continuously subjecting the pyrolyzed material to reaction with methanol in an esterification and fractionating column to produce methyl methacrylate-containing distillate and ammonium acid sulfate-containing bottoms with concomitant formation of semi-solid polymers, the improvement which comprises periodically introducing the methanol at about 1.8 to 2.4 times its normal feed rate while continuing normal feed rate of the pyrolyzed material, thereby cooling the upper portion of the esterification and fractionating column and establishing substantial methanol reflux, maintaining such increased methanol feed until reflux methanol containing the semi-solid polymers flows into the bottoms for vaporization therein to leave the semi-solid polymers in the bottoms, and discharging the semi-solid polymers with the bottoms.

References Cited in the file of this patent

UNITED STATES PATENTS 2,416,756    Jilk ------------------ Mar. 4, 1947

OTHER REFERENCES

Schildknecht, "Vinyl and Related Polymers" (1952), pp. 184–5.

Riddle, "Monomeric Acrylic Esters" (1954), p. 221.